United States Patent
Travostino et al.

(10) Patent No.: US 7,761,573 B2
(45) Date of Patent: Jul. 20, 2010

(54) SEAMLESS LIVE MIGRATION OF VIRTUAL MACHINES ACROSS OPTICAL NETWORKS

(75) Inventors: Franco Travostino, Arlington, MA (US); Phil Wang, Ottawa (CA); Satish Raghunath, Sunnyvale, CA (US)

(73) Assignee: Avaya Inc., Basking Ridge, NJ (US)

( * ) Notice: Subject to any disclaimer, the term of this patent is extended or adjusted under 35 U.S.C. 154(b) by 757 days.

(21) Appl. No.: 11/567,983

(22) Filed: Dec. 7, 2006

(65) Prior Publication Data

US 2007/0180436 A1 Aug. 2, 2007

Related U.S. Application Data

(60) Provisional application No. 60/748,119, filed on Dec. 7, 2005, provisional application No. 60/865,216, filed on Nov. 10, 2006.

(51) Int. Cl.
G06F 15/173 (2006.01)
(52) U.S. Cl. .............. 709/226; 718/1; 718/106
(58) Field of Classification Search ........... 709/206, 709/220, 223, 224, 230, 235, 238, 250, 226; 718/1, 106
See application file for complete search history.

(56) References Cited

U.S. PATENT DOCUMENTS

| | | | | |
|---|---|---|---|---|
| 6,956,868 B2 * | 10/2005 | Qiao | ............ | 370/466 |
| 7,093,086 B1 * | 8/2006 | van Rietschote | ............ | 711/161 |
| 7,203,944 B1 * | 4/2007 | van Rietschote et al. | .... | 718/104 |
| 7,257,811 B2 * | 8/2007 | Hunt et al. | ............ | 718/1 |
| 7,313,793 B2 * | 12/2007 | Traut et al. | ............ | 718/1 |
| 7,383,405 B2 * | 6/2008 | Vega et al. | ............ | 711/162 |
| 7,484,208 B1 * | 1/2009 | Nelson | ............ | 718/1 |
| 2005/0240621 A1 * | 10/2005 | Robertson et al. | ............ | 707/102 |
| 2005/0267959 A1 | 12/2005 | Monga et al. | | |

OTHER PUBLICATIONS

Fumagalli, Andrea et al, A token based protocol for integrated packet and circuit switching in WDM Rings:, Nov. 1998, IEEE Global TeleCom Conf 1998 GlobeCom vol. 4 pp. 2339-2344.*

Figueira, Silva et al., "Advance Reservation of Lightpaths in Optical-Network Based Grids", ICST/IEEE Gridnets, 2004.*

Rouskas, George "Optical Layer Multicast: Rationale, Building Blocks, and Challenges" Jan./Feb. 2003, IEEE Network, pp. 60-65.*

(Continued)

*Primary Examiner*—Jungwon Chang
(74) *Attorney, Agent, or Firm*—Chapin IP Law, LLC; David W. Rouille, Esq.

(57) ABSTRACT

Described are a network and method for performing live migration of a virtual machine (VM) executing at a source site to at least one destination site over an optical network. An application program executes on the VM on behalf of a client system. In the event of a VM migration, a virtual machine turntable control agent coordinates the resource allocation with the VM data transfer. One or more lightpaths are dynamically and securely established through the optical network between the source site and the destination site(s). The VM migration from the source site to multiple destination sites occurs simultaneously, while the application program executes on the VM. After the VM migration, the application resumes at the destination site(s).

20 Claims, 5 Drawing Sheets

OTHER PUBLICATIONS

Nortel Technical Journal Issue Feb. 1, 2005 pp. 23-26.*
van Oudenaarde, Bas "The Multi-domain Control Challenge" SC2004 May 2005 3 pages.*
K McCloghrie, RTC 2932 "IPv4 Multicast Routing MIB" IETF Oct. 2004 26 pages.*
D. Thaler, RTC 2667 "IP Tunnel MIB" IEFW Aug. 1999.*
L Gomman et al, "Token-Based Authorization of Connection oriented Network Resources", 1st Interantional Workshop on Networks for Grid Applications ( GridNets 2004), Oct. 29, 2004.*
Nortel; "Dynamic Resource Allocation Controller (DRAC)"; 6 pages.
Clark, Christopher et al.; "Live Migration of Virtual Machines"; 14 pages.
Gommans, Leon et al.; "Applications Drive Secure Lightpath Creation across Heterogeneous Domains"; IEEE Communications Magazine; 11 pages.
Barham, Paul et al.; "Xen and the Art of Virtualization"; 14 pages.
Gommans, Leon et al.; "Token-based authorization of Connection Oriented Network Resources"; 8 pages.
Vollbrecht, J. et al.; "AAA Authorization Framework"; RFC 2904; Aug. 2000; 35 pages.
Gommans, Leon; "Token Based Networking"; GridNets 2004; 21 pages.

* cited by examiner

SEAMLESS LIVE MIGRATION OF VIRTUAL MACHINES ACROSS OPTICAL NETWORKS

RELATED APPLICATIONS

This utility application claims the benefit of U.S. Provisional Patent Application No. 60/748,119, filed on Dec. 7, 2005, and of U.S. Provisional Patent Application No. 60/865,216, filed on Nov. 10, 2006. These provisional applications are incorporated by reference herein in their entirety.

FIELD OF THE INVENTION

The invention relates generally to networks. More particularly, the invention relates to seamless, live migration of a virtual machine over an optical network.

BACKGROUND

The use of resource virtualization in data centers is becoming widespread. Virtualization generally describes a software abstraction that separates a computer resource and its use from the underlying physical device. Generally, a virtual machine (VM) provides a software execution environment and can have a virtual processor, virtual system memory, virtual storage, and various virtual devices. Virtual machines have the advantageous ability to accomplish tasks independently of particular hardware implementations or configurations.

A VM runs an operating system and operates as though executing on the actual hardware of the physical electronic device. A layer of software provides an interface between the VM and the actual underlying physical hardware. Recent advances have shown that VM technology can support a fully featured operating system, like Linux, with little runtime overhead when compared to native environments. To date, however, instantiations of VMs have been limited to execution within the local confines of a data center.

SUMMARY

In one aspect, the invention features a method of performing live migration of a virtual machine that is executing at a source site to a destination site over an optical network. The method comprises executing an application program on the virtual machine on behalf of a client system, during which execution the client system maintains communication with the virtual machine and the application program. A lightpath is dynamically established through the optical network between the source site and the destination site. While the application program executes on the virtual machine, a copy of the virtual machine is transferred over the lightpath from the source site to the destination site. After the transfer, the application suspended at the source site resumes execution at the destination site.

In another aspect, the invention features a network system including a source computing system with a processor running a virtual machine and executing an application program on the virtual machine on behalf of a client system. A destination computing system is in communication with the source computing system over an optical network. A virtual machine turntable control (VMTC) agent acquires a lightpath through the optical network between the source computing system and the destination computing system and, while the application program executes on the virtual machine, coordinates the transfer of a copy of the virtual machine from the source computing system to the destination computing system over the acquired lightpath.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
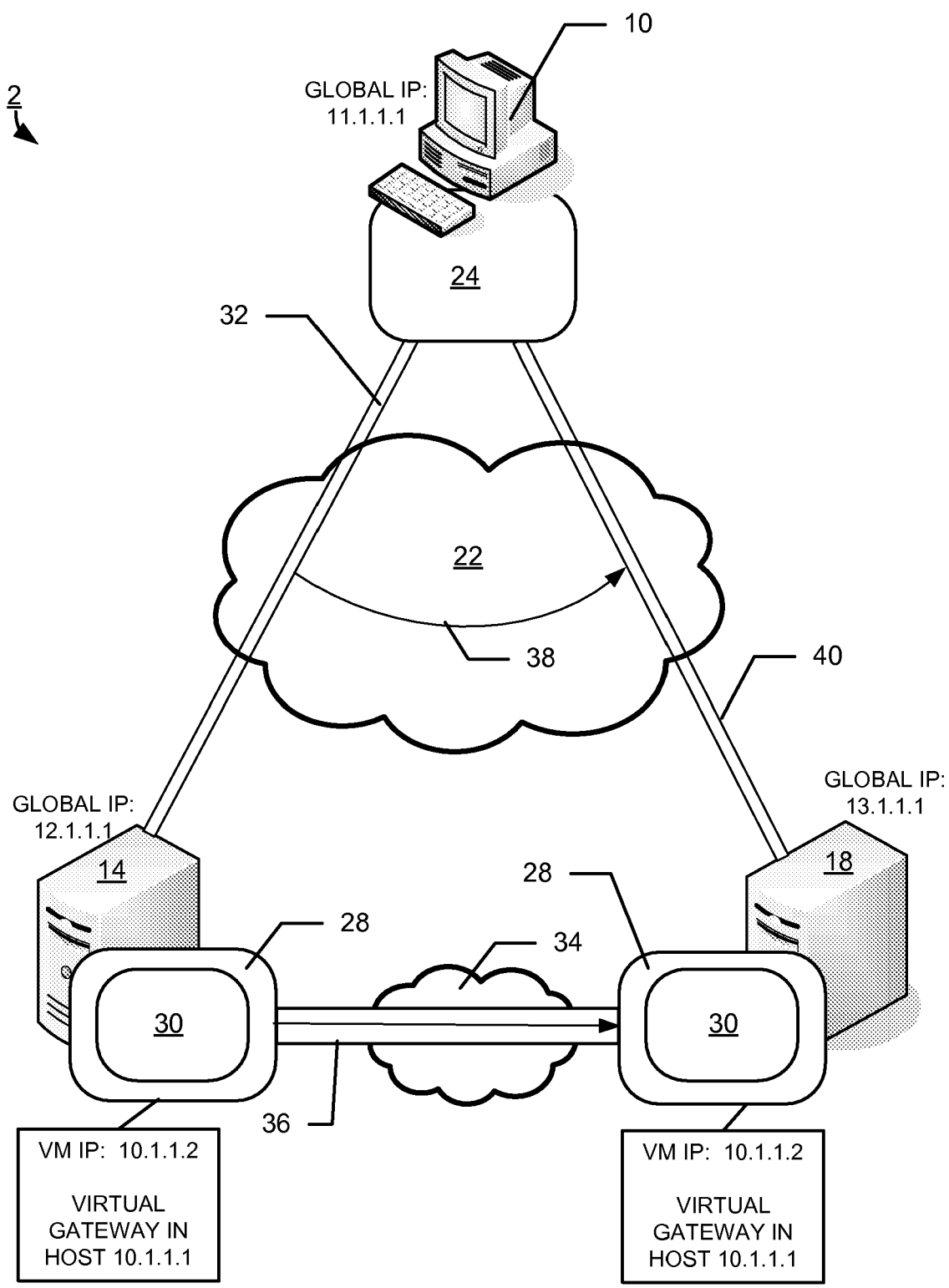
FIG. 1 is a block diagram representation of an example of live VM migration from a source computing system to a destination computing system over an optical network in accordance with the invention.

Network systems constructed in accordance with the invention can perform a live migration of a virtual machine (VM) running on a source site to one or more destination sites across an optical network (e.g., MANs, WANs). Live migration, as used herein, refers to a near-continuous operation of a set of processes while such processes undergo transfer from a source site to a destination site. In general, live migration experiences negligible downtime—the time when no CPU cycle is devoted to any of the VM-resident applications, either at the source site or at any destination site—particularly in comparison to its non-live counterpart, namely a VM-wide "suspend, copy, and then resume" migration. Because of such negligible downtime, live migration occurs transparently (also called seamlessly) with respect to any application programs running on the virtual machine and to any external entities (i.e., clients) interacting with such application programs. In addition, the VM migrates in its entirety to the destination site. Upon completion of the live migration, the VM revives at the destination site without any trace left behind at the source site; that is, "breadcrumbs" do not remain at the source site to address residual dependencies, such as performing system calls or memory accesses, on behalf of the migrated VM.

Live VM migration of the invention involves the "on-the-fly" allocation of computing and network resources. Transfer of the current state of the VM, which includes data and process information stored in memory, cache and on hard disk at the source site, occurs by way of a dynamically allocated, deterministic "lightpath" network service. This lightpath includes an optical end-to-end logical link in an optical physical network between the source site and each destination site.

Typically, this lightpath will cross multiple domains (e.g., a sourcing domain, a recipient domain, and one or more intervening network domains). Trust may be limited among such domains. Each of the domains and their connections may be vulnerable to security exploitations. For example, a VM may be compromised by an insider subverting the recipient domain or be hijacked completely into a faked recipient domain. Because the live migration entails pre-allocation of resources, there is a risk of resource theft disrupting the migration and the remote execution. To reduce this risk, an embodiment of the invention employs a security mechanism that restricts use of pre-allocated resources, such as the lightpath, to those software applications or agents authorized to perform the VM migration.

The ability to migrate VMs among multiple distributed sites provides various new benefits for VM-based environments. The invention is particularly advantageous in environments where it is impossible or impractical, for various reasons, to bring the data (or devices) close to the computation engine. For example, corporate or government policy can impose limitations on the location of a data set, such as embargoing export thereof. Capacity limitations illustrate another example, where an exceedingly large data set can impose an unwieldy preamble to the computation. In such examples, moving the VM to where the data reside offers a more viable alternative to moving the data to the VM.

VM migration across long-haul networks also enables an enterprise to implement load balancing of computation workloads that transcends the confines of individual data centers. For example, one corporate policy may dictate consolidation of the computation workload into fewer data centers within a regional area during non-business hours. Such consolidation can serve to limit operating expenses or power consumption. Another policy might require that the computation workload "tracks the moon" across different geographical areas in order to harvest spare computational power that becomes available during the non-business hours of various time zones.

In addition, VM migration across long-haul networks can support operational business continuance policies and disaster recovery capabilities while meeting regulations for geographic diversity. The VM migration enables orderly evacuation of computation out of data centers that experience or anticipate failures, security compromises, or storms in their access network.

FIG. 1 shows an embodiment of a network system 2 in which live VM migration across an optical network may be implemented and practiced in accordance with the invention. The network system 2 includes a client system 10, a source computing system 14, and a destination computing system 18. The source and destination computing systems 14, 18 are at different physical locations, potentially separated geographically by considerable distance, in terms of hundreds or thousands of miles, although the principles of the invention apply also to shorter distances.

Typically situated at a different geographical location from either computing system 14, 18, for example, at an end user's premises, the client system 10 is in communication with each computing system 14, 18 over a network 22. For such network communications, the client system 10 has an assigned global network address, here, e.g., 11.1.1.1. Embodiments of the network 22 include, but are not limited to, local-area networks (LAN), metro-area networks (MAN), and wide-area networks (WAN). The client system 10 can connect to the network 22 through one of a variety of Internet connections, such as standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11(g)).

The client system 10 may have a display screen, a processor (not shown), memory (not shown) and other components. Exemplary embodiments of the client system 10 include, but are not limited to, personal computers (PC), Macintosh computers, workstations, laptop computers, kiosks, hand-held devices, such as a personal digital assistant (PDA) and a BlackBerry™, cellular phones, navigation and global positioning systems, and network terminals. Running on the client system 10 is a client-side application program 24, which communicates with its application program 30 and the VM 28.

In one embodiment, the source and destination computing systems 14, 18 are servers running a fully featured operating system, e.g., Linux. Each server may be a member of a different data center (i.e., as one server among multiple networked servers at a given site). Assigned to each computing system 14, 18 is a unique global network address (exemplified in FIG. 1 by IP addresses 12.1.1.1 and 13.1.1.1, respectively).

Running on the source computing system 14 is a VM 28. An application program 30 executes on the VM 28 and interacts with the client-side application 24 running on the client system 10. The client system 10 can thus serve as a visualization host that receives and displays results produced by execution of the application program 30.

In one embodiment, the VM 28 is a Xen virtual machine (e.g., version 2.0.7 or version 3.0 VM produced by XenSource, Inc. of Palo Alto, Calif.), with additional features such as jumbo Ethernet frame support and migration monitoring. In general, a Xen VM (and its applications) can be migrated in its entirety from one physical host to another physical host. Clark et al. in "Live Migration of Virtual Machines," 2nd Symposium on Networked Systems Design and Implementation (NSDI) 2005, May 2005, describe an implementation of live migration of Xen VMs within a local subnet, the entirety of which is incorporated by reference herein.

Assigned to the VM 28, e.g., by a network administrator, is a private IP address. (In FIG. 1, the VM 28 has an exemplary private IP address of 10.1.1.2). This assigned private IP address is unique to the particular data center hosting the source computing system 14, but may not be globally unique. For example, the source computing system 14 may be running a plurality of VMs, with each VM having its own private IP address. Although these private IP addresses are unique locally to the source computing system 14, the same private IP addresses can be applied for the VMs running on another computing system.

The VM 28 communicates with other computing systems on the network 22 through a virtual gateway interface that is assigned a gateway network IP address (here, e.g., 10.1.1.1). When more than one VM is running on the source computing system 14, each communicates through the same virtual gateway interface. Generation of the virtual gateway interface can take place when the source computing system 14 initializes (e.g., when the virtual environment for the VM 28 is started).

Connectivity between the client system 10 and the VM 28 occurs through an IP tunnel 32 (i.e., generally, an encapsulation of one IP packet within another). Communications exchanged between the application program 24 executing at the client system 10 and the application program 30 executing on the VM 28 use the virtual IP address of the VM 28. These communications are encapsulated within IP packets that use the global network addresses of the physical computing systems 10, 14. The global network address ensures delivery of the IP packet to the source computing system 14, whereas the private IP address ensures the communication delivery to the appropriate VM 28 on the source computing system 14.

For example, a packet sent from the client system 10 to the VM 28 has a source global network address of 11.1.1.1, a destination global network address of 12.1.1.1, and a destination private network address of 10.1.1.2. Conversely, a packet sent from the VM 28 on the source computing system 14 to the client system 10 has a source global network address of 12.1.1.1, a destination global network address of 11.1.1.1, and a source private network address of 10.1.1.2.

During a live VM migration, the source computing system 14 is in communication with the destination computing system 18 across an optical network 34 by way of a dynamically established lightpath 36. Embodiments of the optical network 34 include, but are not limited to, metro-area networks (MANs) and wide-area networks (WANs). Although shown separately, the networks 22, 34 can be part of the same network. Typically, the lightpath 36 spans multiple domains, potentially traversing one or more intermediate domains (trusted or not trusted).

In general, the lightpath 36 represents an optical end-to-end network service (logical link, circuit, DWDM channel) between the source and destination computing systems 14, 18 through the optical network 34. The lightpath 36 has characteristics suited to seamless live VM migration across geographically separated sites. Such characteristics include, but are not limited to, the ability to establish the lightpath 36 dynamically when the VM migration starts, and to "tear down" the lightpath 36 when the VM migration ends. In addition, by being a logical link or circuit dedicated to the transport of the VM 28 from the source computing system 14 to the destination computing system 18, the lightpath 36 can provide performance guarantees (with deterministic results). Also, the large carrying capacity of the lightpath 36 (typically, 1 Gbs or greater) can lessen the effects of round trip time (RTT) inherent in long-haul data transfers. With high data transfer rates, the iterative process used to transfer the VM 28 over the lightpath 36 rapidly converges to data synchronization, described below.

Another characteristic of the lightpath 36 is that it is comprised exclusively of circuits no higher than layer 2 (e.g., layers 0, 1, and 2, but no routed paths, i.e., layer 3). The connection layers referred to herein correspond generally to a framework of layered protocols for data communications, such as that provided by the OSI (Open System Interconnect) reference model. Layer 3(L3), called the network layer, generally provides functional and procedural mechanisms for establishing and terminating a connection between end systems and for routing data across the network. By avoiding L3 routing, the lightpath 36 avoids potential problems induced by delays in packet forwarding.

Layer 2(L2), called the link layer, generally provides fast transit of data across a physical link. In general, L2 protocols impose a frame structure to the data and transmit frames sequentially based on their physical address. Layer 1(L1), called the physical layer, generally defines functional, procedural, electrical, and mechanical specifications for transmitting raw data bits over a communication channel. An example of physical layer technology is SONET/SDH, which transports information between section, line, and path terminals (i.e., network elements). Layer or sub-layer 0(L0), called the optical layer, is a subdivision of L1. For example, a DWDM (Dense Wavelength Division Multiplexing) network operates at the L0 level, to provide a plurality of channels over a fiber.

Live VM migration in accordance with the invention involves transferring the state of the VM 28 to the destination computing system 18 over the lightpath 36 while the VM 28 continues to run. Data related to the state of the VM 28 are stored on the hard disk and in cache at the source computing system 14. Such VM state-related data include CPU state, memory pages, protocol states, etc. Transferal of the state of the VM 28 to the destination computing system 18 includes an iterative copy stage and a synchronization stage.

During the initial iteration of the iterative copy stage, the entire state of the VM 28 is transferred over the lightpath 36. The amount of time taken to execute this transfer depends upon the amount of data to be transferred and the round trip time to the destination computing system 18. Subsequent iterations involve the transfer of "delta" data, i.e., data (related to the VM state) stored on hard disk or in cache that have changed during the previous copy iteration. Generally, the amount of delta data and the time needed to transfer this delta data decrease during each subsequent copy iteration. When the amount of delta data diminishes to a threshold, the synchronization stage begins. This threshold can be pre-established to tune competing performance factors: downtime versus the time spent migrating the VM state to the destination computing system 18.

In one embodiment, the snapshot capability of a Logical Volume Manager (LVM), which is available with most Linux distributions, can achieve the copying of the hard disk data. The copy-on-write logic of the LVM for disk blocks provides a delta protocol for disk contents that change while the live migration is in progress.

During the synchronization stage, execution of the VM 28 ceases at the source computing system 14 and begins at the destination computing system 18. Before the VM 28 starts executing at the destination computing system 18, a final iteration copy of delta data produces a consistent copy of the VM 28 at the source and destination computing systems 14, 18. The client system 10 is then redirected to communicate with the VM 28 executing at the destination computing system 18 because its application is now running at the destination as a part of the VM 28.

Redirection occurs by reconfiguring the IP tunnel 42 used by the application program 24 executing on the client system 10 to interact with application program 30 executing on the VM 28. More specifically, the client system 10 starts communicating (arrow 38) with the destination computing system 18 through a new IP tunnel 40. Similar to the previous IP tunnel 32 used prior to the migration, this new IP tunnel 40 encapsulates the communications between the application program 24 on the client system 10 and the VM 28, now residing at and executing on the destination computing system 18.

Although reconfiguration of the IP tunnel results in a new destination global network address (here, e.g., 13.1.1.1), the virtual IP address associated with the VM 28 and the gateway interface address associated with the virtual environment remain unchanged. Consequently, a packet now sent from the client system 10 to the VM 28 still has a source global network address of 11.1.1.1, but the destination global network address has changed to 13.1.1.1. In addition, the destination private network address remains unchanged at 10.1.1.2, signifying that the migration of the VM 28 is transparent to the user of the client system 10 and to the executing application programs 24, 30. Conversely, a packet sent from the VM 28, now executing on the destination computing system 18, to the client system 10 has a source global network address of 13.1.1.1, while the destination global network address (11.1.1.1) and source private network address (10.1.1.2) remain unchanged.

Reconfiguration of the IP tunnel thus provides a layer 3 mechanism that retains connectivity to the VM 28 across network domains during its live migration without relying on standard routing infrastructure. Thus, the VM 28 does not need to acquire an IP address determined by the network to which it has migrated. (Acquiring a new IP address would break an active TCP session between the client system 10 and the application program 30 on the VM 28, resulting in unsatisfactory downtime). Accordingly, the VM 28 maintains the same virtual IP address before and after its live migration. Because the private IP address of the VM 28 remains unchanged, the reconfiguration of the IP tunnel is invisible to the TCP (layer 4) and any other higher-layer session.

Figure 2:
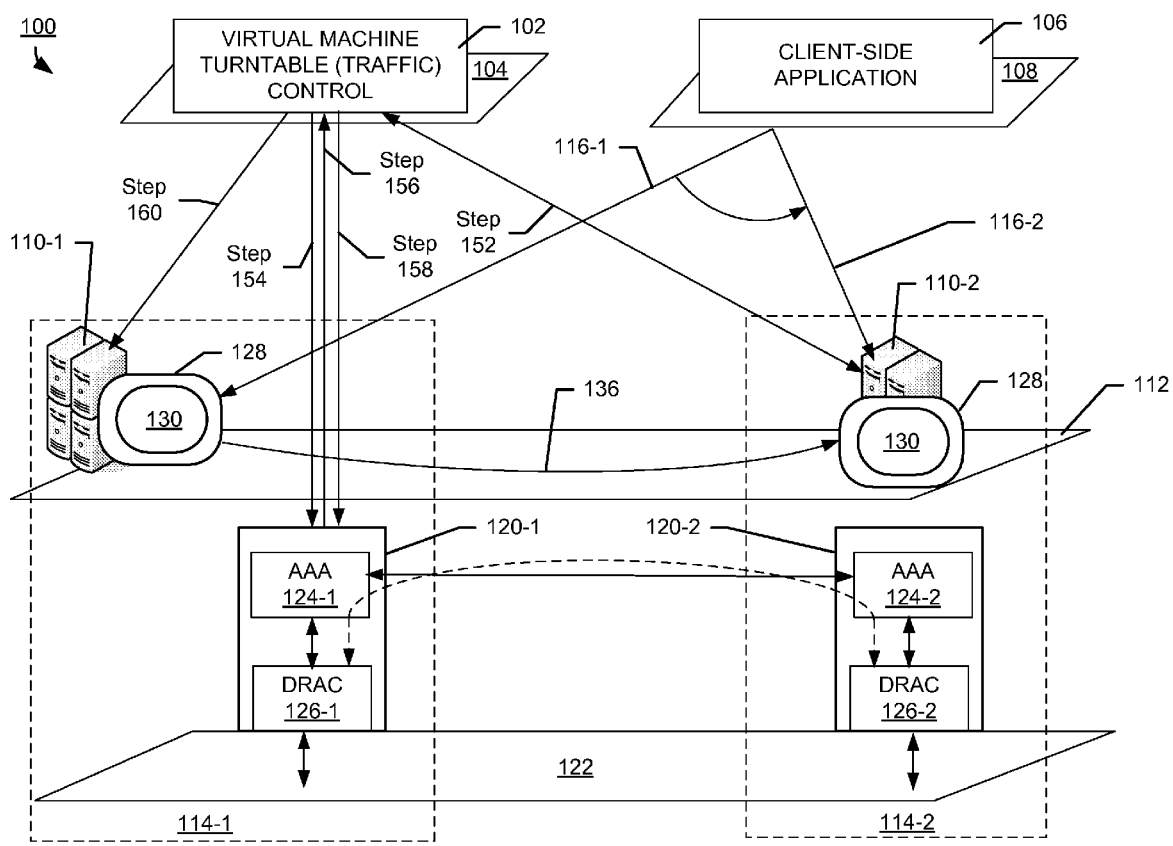
FIG. 2 is a block diagram representation of an embodiment of a network system constructed in accordance with the invention to perform live VM migration.

FIG. 2 shows a diagrammatic representation of an embodiment of a network system 100 within which live VM migration may be implemented in accordance with the invention. The network system 100 includes a virtual machine turntable control (VMTC) agent 102 executing at a multi-resource coordination plane 104 and a client-side application 106 executing at a user plane 108. The VMTC agent 102 operates at one or more server systems of a data center; the client-side application, at a computing system such as client system 10, described above.

Computing systems 110-1, 110-2 (generally, 110) operate at a virtual computation plane 112. Each computing system 110 operates within a different network domain 114-1, 114-2 (represented as dashed boxes). In this example, the computing system 110-1 is running a VM 128 on which an application program 130 is running. The application program 130 is in communication with the client-side application 106 through an IP tunnel 116-1 to render the results at the user plane 108. While executing within network domain 114-1, the VM 128 has proximate access to its application data, which is usually managed by a local storage server.

The VMTC agent 102 includes software (e.g., JAVA code) for interfacing and coordinating the live migration of VMs with the provisioning of network resources and the re-provisioning of the IP tunnel to ensure seamless layer 3-7 connectivity to applications running on the VMs. To achieve this live migration, the VMTC agent 102 allocates and coordinates various types of resources, including computation resources, network resources, and data resources.

To provide for computational resources, the VMTC agent 102 brokers a computing environment that has sufficient processing power (i.e., CPU cycles) and memory before migration of the VM 128. This negotiation for computing resources, represented by arrow 120, ensures that the VM 128 and its application 130 will be able to run at the destination site. One exemplary policy is for the VMTC agent 102 to give preference to destination computing systems with under-subscribed hyper-threads when searching for a destination site suited to the VM 128. In one embodiment (not shown), the VMTC agent 102 negotiates with a peer VMTC agent in the network domain of the destination computing system.

To provide for network resources in support of live VM migration, the VMTC agent 102 is in communication with a network service agent 120-1 to acquire a secure, deterministic, end-to-end optical network service (i.e., lightpath 136) between the source computing system 110-1 and the destination computing system 110-2. For example, the VMTC agent 102 can broker an end-to-end network service that closely approximates a circuit of highly predictable performance for the short duration of the live migration. After the migration completes, the network service can be torn down or recast to a lesser service to allow for a trickle of remote data references.

To provide location-specific data resources for VM applications, the VMTC agent 102 operates as an information directory service for locating data and as a replica manager for migrating data as an alternative or as a complement to the live migration of the VM 128. The information directory service tells the VM applications where to find the data resources. Or, the application may also communicate with its client system 108 for data resources. The data resources are usually managed by a local storage server at the VM site.

The network service agent 120-1 operates at a network service plane 122, and may reside in the network domain 114-1 of the source computing system 110-1. In one embodiment, the network service agent 120-1 includes a resource security service such as an Authentication, Authorization, and Accounting (AAA) agent 124-1 in communication with a resource allocation service such as Dynamic Resource Allocation Controller (DRAC) agent 126-1. In general, the AAA agent 124-1 controls the allocation of available VM resources used to achieve live migration. In effect, the AAA agent 124-1 extends the computing environment of the VM 128 to all intervening domains between the source computing system 110-1 and the destination computing system 110-2 for the duration of the migration. Vollbrecht et al. describe a framework within which to implement an embodiment of the AAA agent 124-1 in "AAA Authorization Framework," Internet Engineering Task Force RFC2904, August 2000, the entirety of which is incorporated by reference herein.

To accomplish allocation that spans various network domains, the AAA agent 124-1 communicates with the DRAC agent 126-1 and with peer AAA agents, such as AAA agent 124-2 of a network service agent 120-2 in the destination network domain 114-2. Gommans et al. describe an example of such allocation in "Applications Drive Secure Lightpath Creation across Heterogeneous Domains," published by an IEEE Communications Magazine, vol. 44, no. 3, the entirety of which is incorporated by reference herein.

The DRAC agent 126-1 exposes a service-oriented application program interface (API) for coupling with applications, enabling such applications to establish optical end-to-end lightpath, such as lightpath 136. The DRAC agent 126-1 includes a policy engine, a topology and discovery engine, workflow utilities, inter-domain routing facilities, and dynamic bandwidth management fixtures. To steer network resources, DRAC agent 126-1 binds to network control planes or to individual network elements (e.g., SNMP (Simple Network Management Protocol or TL1 (Transaction Language 1) signaling).

One or more instances of the DRAC agent 126 can execute in each participating network domain 114. When multiple instances of the DRAC agent 126 are running in a single domain, one of the instances is selected master. The DRAC master instance manages the network domain and the inter-domain connectivity through peer messaging (e.g., with DRAC 126-2) and interaction with the AAA agent 124-1.

Figure 3A:
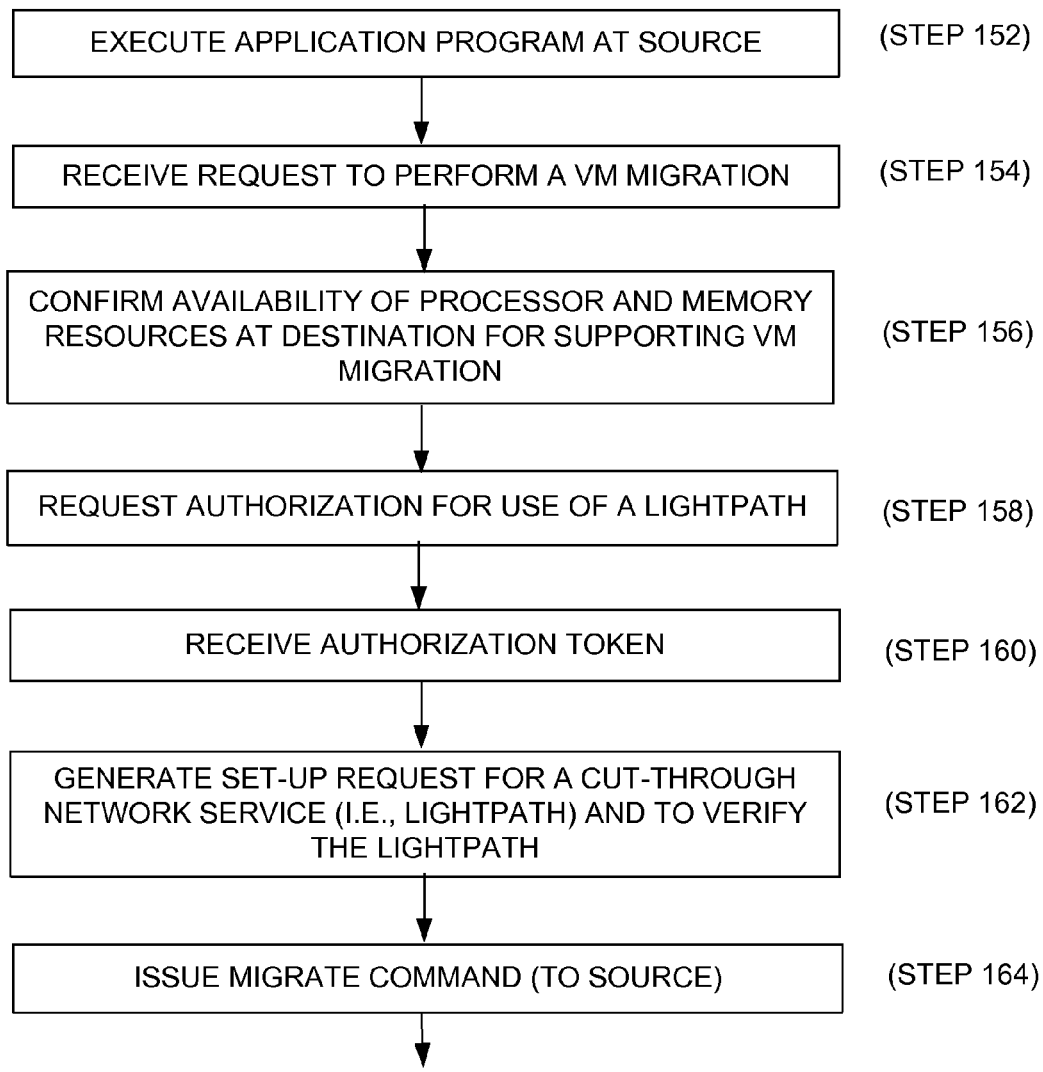
FIG. 3A and FIG. 3B are a flow diagram representation of an embodiment of a process for performing live VM migration from a source computing system to a destination computing system over an optical network in accordance with the invention.
Figure 3B:
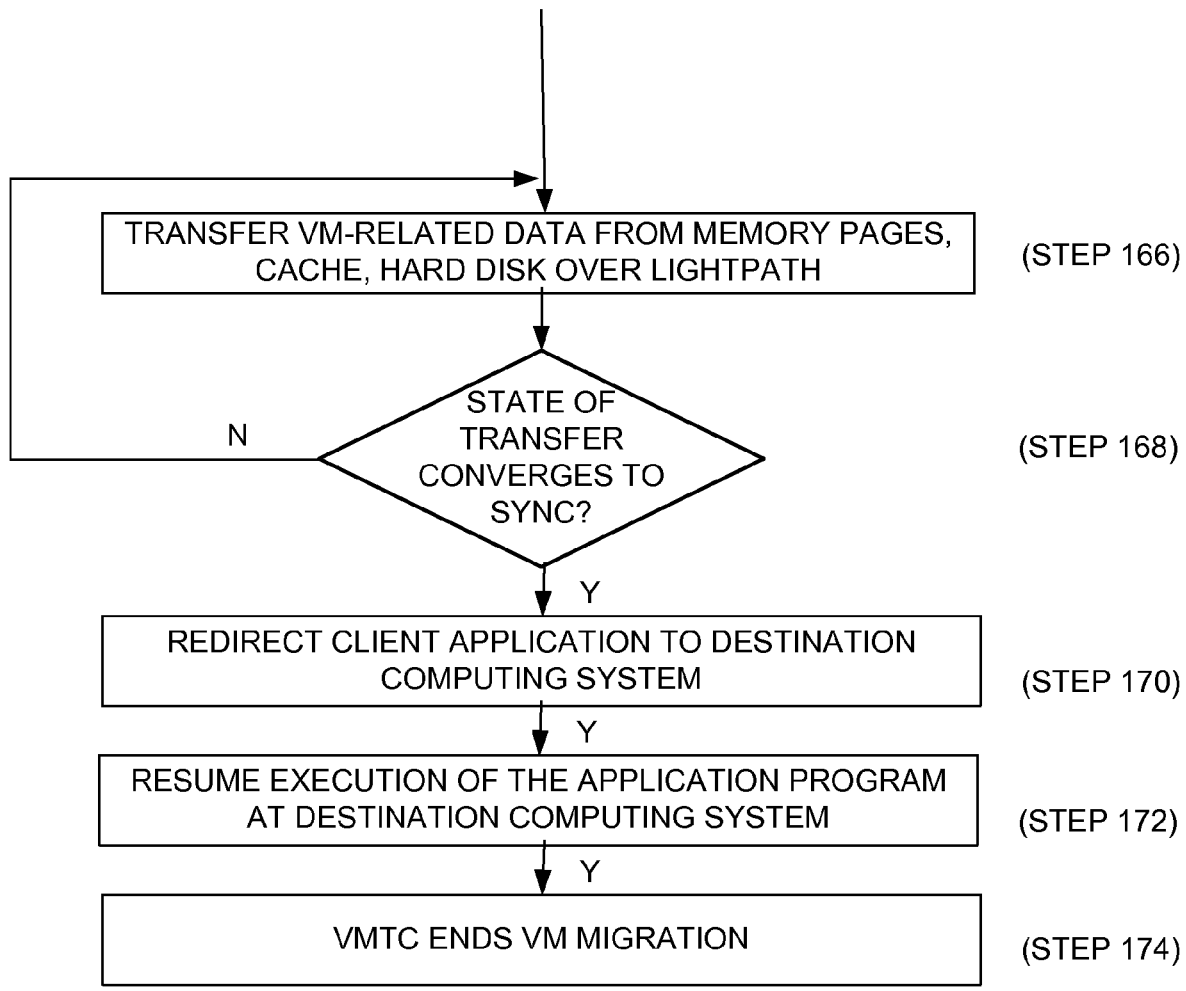

FIG. 3 shows an embodiment of a process 150 for performing live VM migration in accordance with the invention. In the description of the process 150, reference is also made to FIG. 2 (with process some of the steps mentioned in connection with FIG. 3 also appearing in FIG. 2). For purposes of illustrating the process 150 by example, consider an exemplary scenario in which the application program 130 is an application suite that performs an iterative search workflow for a pattern hiding in digital images. The digital images are stored in two unique sets, one set at Amsterdam (locus of network domain 114-1) and another set at San Diego (locus of network domain 114-2). The live migration of the VM 128 from the computing system 110-1 (source) to the computing system 110-2 (destination) allows the application suite (i.e., application 130) to move physically near each image set and, thus, to access the "right" data at the "right" time with the best access latency possible. For instance, the VM 128 has proximate access to VM data within network domain 114-1 before migration and to VM data within network domain 114-2 after migration.

At step 152, an application program executes at the source computing system 110-1. At step 154, the VMTC 102 receives a request (e.g., from an administrator-initiated request or from an application program) to perform a VM migration. At step 156, the VMTC 102 confirms the availability of processing power and memory resources at the destination computing system 110-2 for supporting execution of the VM 128 (and its application 130). To ensure the availability of such resources, the VMTC 102 establishes and maintains connectivity and state information with the destination computing system 110-2 throughout the migration process. This state information is the state of the connection between source and destination computing systems, and the VM migration progressing status.

After confirming that the destination computing system 110-2 can support the VM 128, the VMTC 102 communicates (step 158) with the AAA agent 124-1 to request authorization to acquire use of a lightpath between the source 110-1 and the destination 110-2. The AAA agent 124-1 returns (step 158) the authorization to the VMTC 102 in the form of a token. The token represents a cryptographically strong, forgery-resistant capability and operates to prevent an unauthorized user (i.e., someone without the token) from accessing pre-allocated resources, such as the lightpath 136. Implementation of the token can be out-of-band (i.e., propagated at the level of the control plane) or in-band (i.e., interspersed within the data payload). An AAA mechanism for gaining access to network resources based on a token is described in "Token-based Authorization of Connection Oriented Network Resources" by Gommans et al, 1st International Workshop on Networks for Grid Applications (GridNets 2004), Oct. 29, 2004, the entirety of which is incorporated by reference herein.

The VMTC agent 102 uses the token and migration parameters to generate (step 162) a setup request for, and to verify, an end-to-end, authenticated lightpath between the source and destination computing systems 110-1, 110-2. In effect, this set-up request is for a "cut-through" network service; the cut-through network service being a high-bandwidth, low-latency service that bypasses layer 3 connections and transfers data directly over layer 0, layer 1, or layer 2 connections. The set-up request can further specify whether the network service is to be on-demand or through a time-of-day reservation. In one embodiment, the VMTC agent 102 uses Web Services exchanges to send the request for the cut-through network service to the DRAC 126-1.

Upon receiving confirmation of the existence of the lightpath 136, the VMTC 102 issues (step 164) a migrate command of the VM 128 to the source computing system 110-1. In response, the source and destination computing systems 110-1, 110-2 engage (step 166) in an iterative copy process, described above in connection with FIG. 1, for transferring a copy of the state of the VM 128 to the destination computing system 110-2. When, at step 168, the iterative copy process converges to data synchronization, the VMTC 102 reconfigures (step 170) the IP tunnel 116-1, thereby seamlessly redirecting and connecting the client-side application 106 to the VM 128, now executing on the destination computing system 110-2. The VMTC 102 notifies or works with the client system to reconfigure the IP tunnel. After data synchronization, the application program resumes (step 172) execution at the destination computing system 110-2. Subsequently, the VMTC ends (step 174) the VM migration.

The principles of live VM migration described above can extend to the live migration of a VM from a source site to a number of destination sites (N sites) simultaneously (i.e., 1:N VM migration); that is, a single transmission of the VM (iteratively, as described above) results in two or more destination sites running copies of the VM. In one embodiment, configuration software running at the source site determines which destination sites are to be recipients of a copy of the VM (called sender-controlled multicast). In another embodiment, destination sites subscribe to the broadcast independently of the sender (called receiver-controlled multicast).

Figure 4:
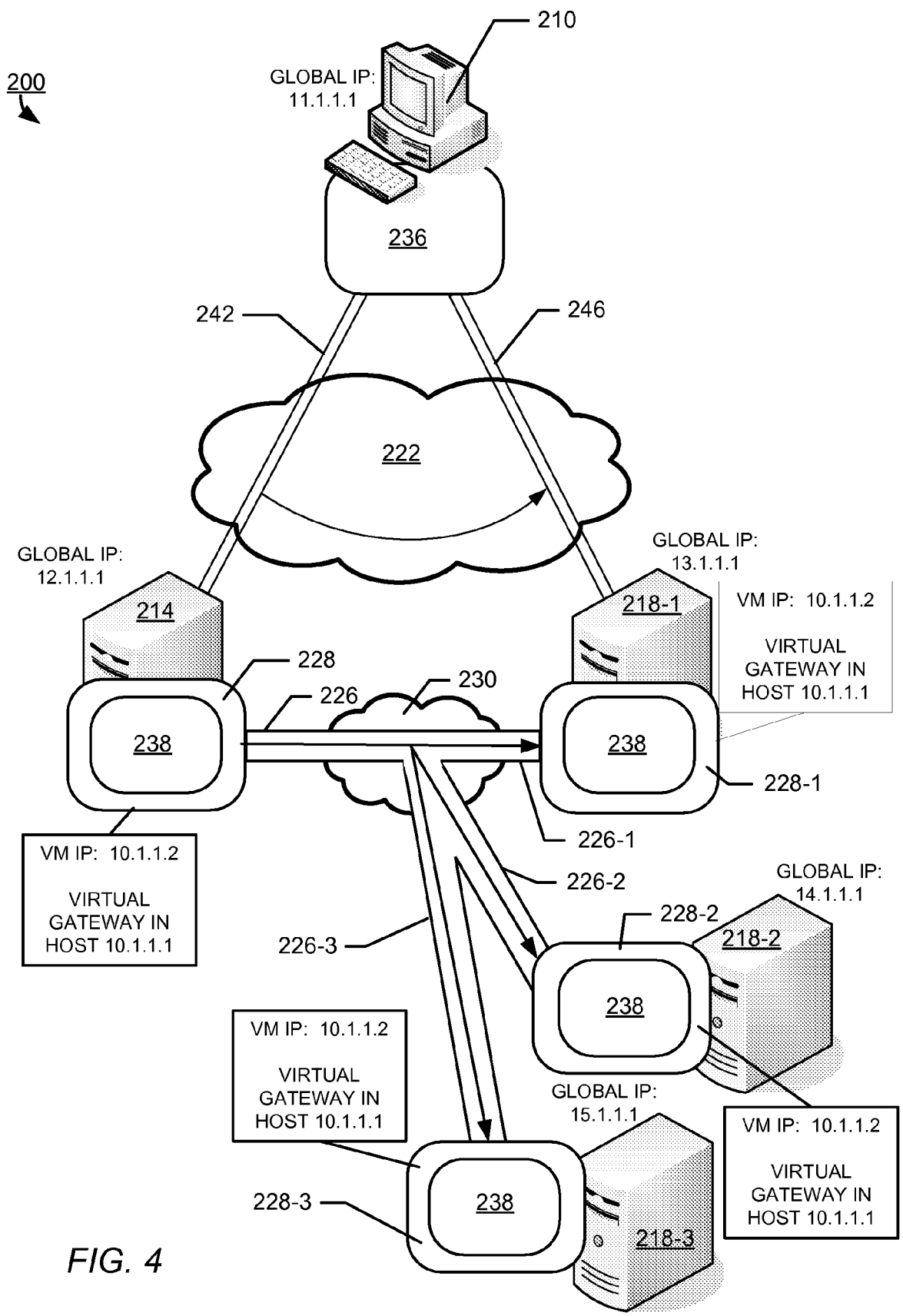
FIG. 4 is a block diagram representation of an example of live VM migration from a source computing system to a plurality of destination computing systems over an optical network in accordance with the invention.

Referring now to FIG. 4, an embodiment of a network system 200 includes a client system 210, a source computing system 214, and a plurality of destination computing systems 218-1, 218-2, 218-3 (generally, 218). As described previously, the source and destination computing systems 214, 218 are at different physical locations, potentially separated geographically by considerable distances, and may communicate with each other across an optical physical network 230. In addition, the client system 210 is at another geographical location, different from any of the other systems 214, 218, and is in communication with each system 214, 218 over an IP network 222. Assigned to each system 210, 214, 218 is a unique global network address, exemplified in FIG. 4 by IP address 11.1.1.1 for the client system 210, IP address 12.1.1.1 for the source computing system 214, and IP addresses 13.1.1.1, 14.1.1.1, and 15.1.1.1, for the destination computing systems 218-1, 218-2, and 218-3, respectively.

The source computing system 214 is running a VM 228. Running on the virtual machine 228 is an application program 238. The client system 210 runs a client-side application 236 that communicates with the application 238 executing on the VM 228. The client-side application 236 receives and optionally displays the results of the application program 238. Connectivity between the client system 210 and the VM 228 occurs through an IP tunnel 242.

The embodiment described in FIG. 4 has various networking characteristics and capabilities adapted to support 1:N VM migration, including rare packet losses, 1:N packet dissemination, deterministic completion of a 1:N transfer, and software that controls the dynamic set-up of the multicast dissemination tree and its endpoints. To realize these capabilities, one can use IP multicast, L2multicast/broadcast, or L1/L0multicast.

During a live VM migration, a DRAC agent in the source network domain (not shown) dynamically establishes a "forked" lightpath network service 226, the tines of which are labeled 226-1, 226-2, 226-3, between the source computing system 214 and the destination computing systems 218-1, 218-2, 218-3, respectively. Characteristics of the lightpath 226 are similar to those of the lightpath 36 (FIG. 1) described above, with an additional capability of simultaneously producing a copy of the VM 228 for each destination computing system 218. This dissemination of the VM 228 can occur using L2broadcasting, L2multicasting, L1multicasting, or L0multicasting over the lightpath 226.

After synchronization, each copy of the VM 228 starts executing at each destination computing system 218. In one embodiment, the VM 228 can also resume executing at the source computing system 214 (e.g., instead of being discarded). In addition, communications between the client system 210 and the VM 228 on the source computing system 214 become redirected to one, more, or all destination computing systems 218. When the VM 228 is still executing on the source computing system 214, the client system 210 can continue to communicate with that VM 228 in addition to communicating with the copies of the VM 228 executing on the destination computing systems 218. To implement redirection, the IP tunnel 242 between the application 236 executing on the client system 210 and the VM 228 on the source computing system 14 may be reconfigured to one or more new IP tunnels (exemplified by IP tunnel 246). As another example, the client system 210 can use IP multicasting to communicate with each destination computing system 218 running a copy of the VM 228, including the source computing system 214.

Program code (or software) of the present invention may be embodied as computer-executable instructions on or in one or more articles of manufacture, or in or on computer-readable medium. A computer, computing system, or computer system, as used herein, is any programmable machine or device that inputs, processes, and outputs instructions, commands, or data. In general, any standard or proprietary, programming or interpretive language can be used to produce the computer-executable instructions. Examples of such languages include C, C++, Pascal, JAVA, BASIC, Visual Basic, and Visual C++.

Examples of articles of manufacture and computer-readable medium in which the computer-executable instructions may be embodied include, but are not limited to, a floppy disk, a hard-disk drive, a CD-ROM, a DVD-ROM, a flash memory card, a USB flash drive, an non-volatile RAM (NVRAM or NOVRAM), a FLASH PROM, an EEPROM, an EPROM, a PROM, a RAM, a ROM, a magnetic tape, or any combination thereof. The computer-executable instructions may be stored as, e.g., source code, object code, interpretive code, executable code, or combinations thereof. Further, although described predominantly as software, embodiments of the described invention may be implemented in hardware (digital or analog), software, or a combination thereof.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method of performing live migration of a virtual machine that is executing at a source site to a destination site over an optical network, the method comprising:
   executing an application program on the virtual machine on behalf of a client system, during which execution the client system maintains communication with the virtual machine and the application program;
   dynamically establishing a lightpath through the optical network between the source site and the destination site;
   while the virtual machine continues to execute at the source site and the application program continues to execute on the virtual machine, iteratively transferring a copy of the virtual machine over the acquired lightpath from the source site to the destination site until the iterative transfer produces a consistent copy of the virtual machine at the destination site; and
   redirecting execution of the application program to the consistent copy of the virtual machine produced at the destination site.

2. The method of claim 1, wherein the client system communicates with the virtual machine through an Internet Protocol (IP) tunnel, and further comprising the step of reconfiguring the IP tunnel so that the client system switches from communicating with the virtual machine on the source site to communicating with the copy of the virtual machine transferred to and running on the destination site.

3. The method of claim 1, wherein the lightpath transports the virtual machine to the destination site at a connection layer lower than layer 3.

4. The method of claim 1, further comprising the step of associating an authorization token with use of the lightpath.

5. The method of claim 1, wherein the transferring step includes simultaneously transferring a copy of the virtual machine from the source site to a plurality of destination sites over the lightpath between the source site and each destination site.

6. The method of claim 5, further comprising directing the client system to communicate with IP multicasting in order to communicate with each copy of the virtual machine transferred to and running on one of the destination sites.

7. The method of claim 5, further comprising the step of establishing, at the source site, which destination sites are to receive a copy of the virtual machine.

8. The method of claim 5, further comprising the step of subscribing, by each destination site, to a broadcast of the virtual machine by the source site.

9. The method of claim 5, wherein the source site employs one of an Layer 2(L2) multicast, L2broadcast, Layer 1(L1) multicast, or a Layer 0(L0) multicast to transfer copies of the virtual machine to the destination sites over the lightpath.

10. A network system comprising:
    a source computing system with a processor running a virtual machine and executing an application program on the virtual machine on behalf of a client system;
    a destination computing system in communication with the source computing system over an optical network; and
    a virtual machine turntable control (VMTC) agent acquiring a lightpath through the optical network between the source computing system and the destination computing system and, while the virtual machine continues to run at the source computing system and the application program executes on the virtual machine, coordinating an iterative transfer of a copy of the virtual machine from the source computing system to the destination computing system over the lightpath until the iterative transfer produces a consistent copy of the virtual machine at the destination computing system.

11. The network system of claim 10, wherein the client system communicates with the virtual machine through an IP tunnel; and the VMTC agent reconfigures the IP tunnel such that the client system switches from communicating with the virtual machine running on the source computing system to communicating with the copy of the virtual machine transferred to and running on the destination computing system.

12. The networking system of claim 10, wherein the VMTC agent determines before the transfer of the copy of the virtual machine whether the destination computing system has sufficient computing resources to support execution of the virtual machine.

13. The networking system of claim 10, wherein the lightpath operates at a connection layer that is lower than layer 3.

14. The networking system of claim 10, further comprising an authentication, authorization, and accounting (AAA) agent for associating a security token with use of the lightpath.

15. The networking system of claim 10, further comprising a dynamic resource allocation control (DRAC) agent for dynamically acquiring, in response to a request from the VMTC agent, the lightpath for the transfer of the copy of the virtual machine.

16. The networking system of claim 10, further comprising a second destination computing system, and wherein, during execution of the application program on the virtual machine, the VMTC agent coordinates transfer of a copy of the virtual machine from the source computing system to each destination computing system simultaneously over the lightpath.

17. The networking system of claim 16, wherein the VMTC agent directs the client system to use IP multicasting to communicate with the copies of the virtual machine transferred to and running on the destination computing systems.

18. The networking system of claim 16, further comprising configuration software running at the source computing system for establishing which destination computing systems are to receive a copy of the virtual machine.

19. The networking system of claim 16, wherein each destination computing system subscribes to a broadcast of the virtual machine.

20. The networking system of claim 10, wherein the source computing system employs one of an Layer 2(L2) multicast, L2broadcast, Layer 1(L1) multicast, or a Layer 0(L0) multicast to transfer the copies of the virtual machine to the destination computing systems over the lightpath.

* * * * *